Patented Aug. 28, 1951

2,566,123

UNITED STATES PATENT OFFICE 2,566,123

STABLE VITAMIN $B_{12}$ SOLUTION

Anthony De Rose, Chicago, Ill., assignor to Abbott Laboratories, North Chicago, Ill., a corporation of Illinois No Drawing. Application September 22, 1949, Serial No. 117,260

6 Claims. (Cl. 167—81)

This invention is concerned with stable vitamin solutions and more particularly solutions containing vitamin $B_{12}$. The invention relates to the treatment of solutions containing vitamin $B_{12}$ to prevent destruction of the vitamin. The method of the invention includes treatment of crude and refined solutions and mixtures, as herein indicated with a stabilizing agent to prevent destruction of the vitamin during the processes of obtaining the vitamin $B_{12}$ from its manufacture and in therapeutically valuable concentrates.

Vitamin $B_{12}$ is known to be obtainable from liver, micro-organisms, etc., and the process of extracting the vitamin from its sources is also known. Recently it has been shown that vitamin $B_{12}$ is a product of the growth of a Streptomyces griseus, see Rickes, Science, vol. 108, pages 634–635, 1948, and that the culture broth is a rich source of the vitamin.

Impure solutions of vitamin $B_{12}$ are subject to destruction and loss of vitamin potency when such solutions are subjected to heat. The nature of such decomposition or destruction is not known, but it is important to be able to heat sterilized solutions containing vitamin $B_{12}$ without destroying the vitamin content. For instance, vitamin $B_{12}$ may be extracted from the mycelium of the culture broth of Streptomyces griseus by extracting the mycelium with boiling water, and very little purification renders it a crude concentrate, but it is a therapeutically valuable solution. Also the vitamin is generally administered as an injectable solution, and the solution must be sterilized, and preferably injectable solutions are heat sterilized.

According to the invention I have discovered that the addition of a soluble bitartrate to a solution containing vitamin $B_{12}$ protects the vitamin from destruction by heating. The amount of bitartrate required is very small, generally from 0.001% by weight up to somewhere around 1% which amounts are ordinarily innocuous. It is preferable to use an amount of the stabilizing agent equal to about 0.1% by weight, as such an amount gives complete protection to the vitamin, and is small enough to be innocuous to the patient.

Example I

A sample of vitamin $B_{12}$ concentrate in aqueous solution containing 0.5% phenol, was divided into three parts, one was assayed as a control and the other two were autoclaved to determine the loss of vitamin $B_{12}$. Of the two autoclaved samples one had a 0.1% sodium bitartrate added, and the other sample had no stabilizing agent. The three samples were assayed for vitamin $B_{12}$, and the two were then autoclaved. All three samples were then assayed on four consecutive days, and the control sample, averaged over the four days, was taken as 100%. The autoclaved sample without the sodium bitartrate showed an average loss of about 20% activity, while the sample with the added sodium bitartrate showed 102% vitamin $B_{12}$ activity, which within the assay error is no loss.

Example II

A sample of a vitamin $B_{12}$ solution, containing vitamin $B_{12}$ amounting to about 4% of the dissolved total solids and 0.5% phenol, was divided into three parts as above. One sample was kept as a control and the other two were autoclaved, one with 0.1% sodium bitartrate, and the other without such a stabilizing agent. The non-stabilized sample showed a 39% loss of vitamin activity, whereas the sample stabilized by the sodium bitartrate showed 106% vitamin activity, or within assay error no loss.

The sodium bitartrate is effective in stabilizing vitamin $B_{12}$ in aqueous solutions having a pH of about 3–8. It is preferable, however, to keep the pH in a range of about 4.5–7.

The same stabilizers may also be used when the solvent is partially or predominantly organic.

In the preferred embodiment of the invention sodium bitartrate, as the stabilizing agent, is used in amounts of about 0.001% to about 1.0% to protect the vitamin $B_{12}$ from destruction. Potassium bitartrate in similar quantities also stabilizes the vitamin $B_{12}$. Likewise, other alkali metal bitartrates and non-toxic alkaline earth bitartrates exert the stabilizing effect in solutions of vitamin $B_{12}$.

As at present advised with respect to the apparent scope of my invention, I desire to claim the following subject matter.

I claim:

1. A solution containing vitamin $B_{12}$ as a significant ingredient, said solution also containing a significant percentage of a stabilizer consisting essentially of a soluble non-toxic bitartrate salt, said bitartrate salt being selected from alkali metal and alkaline earth bitartrates.

2. A stable solution according to claim 1 in which the bitartrate is a non-toxic alkali metal bitartrate.

3. A stable solution according to claim 2 in which the bitartrate is sodium bitartrate.

4. A stable solution according to claim 1 in which the bitartrate is present in an amount of at least about 0.001% by weight.

5. A stable vitamin $B_{12}$ solution containing vitamin $B_{12}$ as the active ingredient and at least about 0.001% of a soluble non-toxic alkali metal bitartrate as the stabilizing agent.

6. A stable vitamin $B_{12}$ solution containing vitamin $B_{12}$ as the active ingredient and from 0.001% to 1.0% of sodium bitartrate as the stabilizing agent.

ANTHONY DE ROSE.

REFERENCES CITED

The following references are of record in the file of this patent:

Rickes—Science, vol. 107, page 396 (1948) (167–$B_{12}$). (Copy in Scientific Library).

Rickes—Science, vol. 108, pages 634, 635, December 3, 1948 (167–$B_{12}$). (Copy in Scientific Library).